(12) United States Patent
Bao

(10) Patent No.: US 9,216,511 B2
(45) Date of Patent: Dec. 22, 2015

(54) AUTOMATED WORKPIECE TURNING-OVER DEVICE FOR PRODUCTION LINE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Yan-Cheng Bao, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 325 days.

(21) Appl. No.: 13/859,794

(22) Filed: Apr. 10, 2013

(65) Prior Publication Data

US 2014/0060232 A1   Mar. 6, 2014

(30) Foreign Application Priority Data

Aug. 31, 2012  (CN) .......................... 2012 1 0317839

(51) Int. Cl.
*B65H 15/00* (2006.01)
*B25J 18/00* (2006.01)

(52) U.S. Cl.
CPC ................ *B25J 18/00* (2013.01); *B65H 15/00* (2013.01); *B65H 2403/43* (2013.01); *B65H 2403/481* (2013.01); *B65H 2701/1764* (2013.01); *B65H 2701/1914* (2013.01); *Y10S 901/26* (2013.01); *Y10T 74/20329* (2015.01)

(58) Field of Classification Search
CPC .............. B25J 18/00; B65H 2403/481; B65H 2701/1914; B65H 2403/43; B65H 2701/1764; B65H 15/00
USPC .......... 414/744.1, 744.2, 744.5, 744.6, 744.8, 414/758, 783, 773, 771; 901/19, 25, 26; 74/490.05, 89.13, 89.16
See application file for complete search history.

(56) References Cited

U.S. PATENT DOCUMENTS

| | | | | |
|---|---|---|---|---|
| 3,563,377 A * | 2/1971 | Southcott | ...................... | 209/535 |
| 4,068,536 A * | 1/1978 | Stackhouse | ..................... | 74/417 |
| 4,365,928 A * | 12/1982 | Baily | ............................. | 414/735 |
| 4,378,621 A * | 4/1983 | Babel | ............................ | 29/26 A |
| 5,040,429 A * | 8/1991 | Del Castillo | .................... | 74/424 |
| 5,374,158 A * | 12/1994 | Tessier et al. | ................. | 414/759 |
| 5,456,132 A * | 10/1995 | Iwanaga et al. | ............. | 74/490.06 |
| 5,985,036 A * | 11/1999 | Anderle | ......................... | 118/729 |
| 6,234,742 B1 * | 5/2001 | Rodefeld et al. | .............. | 414/771 |

(Continued)

*Primary Examiner* — Saul Rodriguez
*Assistant Examiner* — Lynn Schwenning
(74) *Attorney, Agent, or Firm* — Novak Druce Connolly Bove + Quigg LLP

(57) ABSTRACT

A workpiece turning-over device includes a support base and two moving arm assemblies oppositely positioned on the support base. Each moving arm assembly includes a rotation member on the support base, a moving arm connected to the rotation member, a spur gear pair, and a bevel gear pair. The spur gear pair includes a first spur gear fixedly sleeved on the moving arm, and a second spur gear rotatably connected with the rotation member and meshing with the first spur gear. The bevel gear pair includes a first bevel gear non-rotatably connected with the rotation member, and a second bevel gear non-rotatably connected with the second spur gear and meshing with the first bevel gear. The two rotation members are rotated in opposite directions.

11 Claims, 3 Drawing Sheets

(56) References Cited

U.S. PATENT DOCUMENTS 6,478,531 B1 * 11/2002 Yang .................... 414/744.3

2007/0256513 A1 * 11/2007 Forslund et al. ........... 74/490.06
2009/0175713 A1 * 7/2009 Fan et al. ...................... 414/759

* cited by examiner

AUTOMATED WORKPIECE TURNING-OVER DEVICE FOR PRODUCTION LINE

BACKGROUND

1. Technical Field

The present disclosure generally relates to devices used for turning-over and transporting workpieces during manufacturing, and particularly to an automated workpiece turning-over device applied in a production line for quickly and smoothly turning or flipping over and transporting a workpiece.

2. Description of the Related Art

Manual turning-over of a workpiece for machining a front surface and a rear surface thereof is typically applied in factory during mass production manufacturing. However, it is easy to damage these surfaces of the workpiece. In addition, work efficiency of the manual turning-over of the workpieces is low.

Therefore, there is room for improvement within the art.

BRIEF DESCRIPTION OF THE DRAWING

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
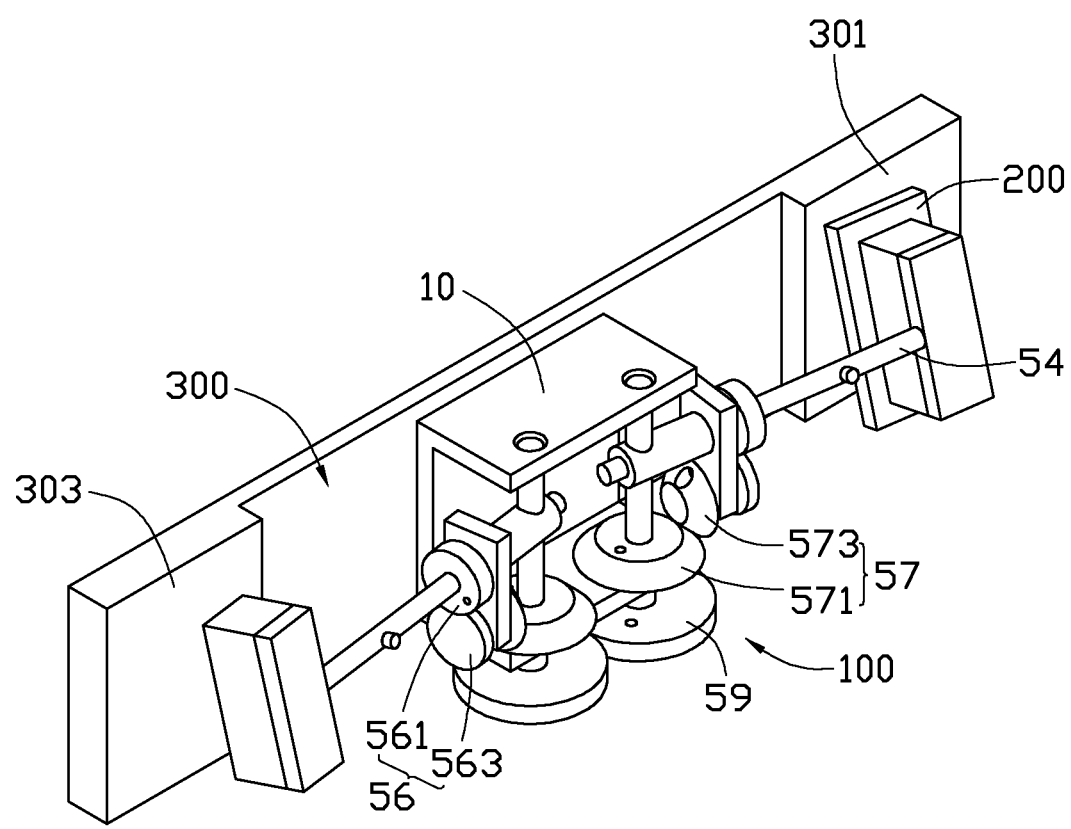
FIG. 1 shows an assembled, isometric view of an embodiment of a workpiece turning-over device positioned on a worktable.
Figure 2:
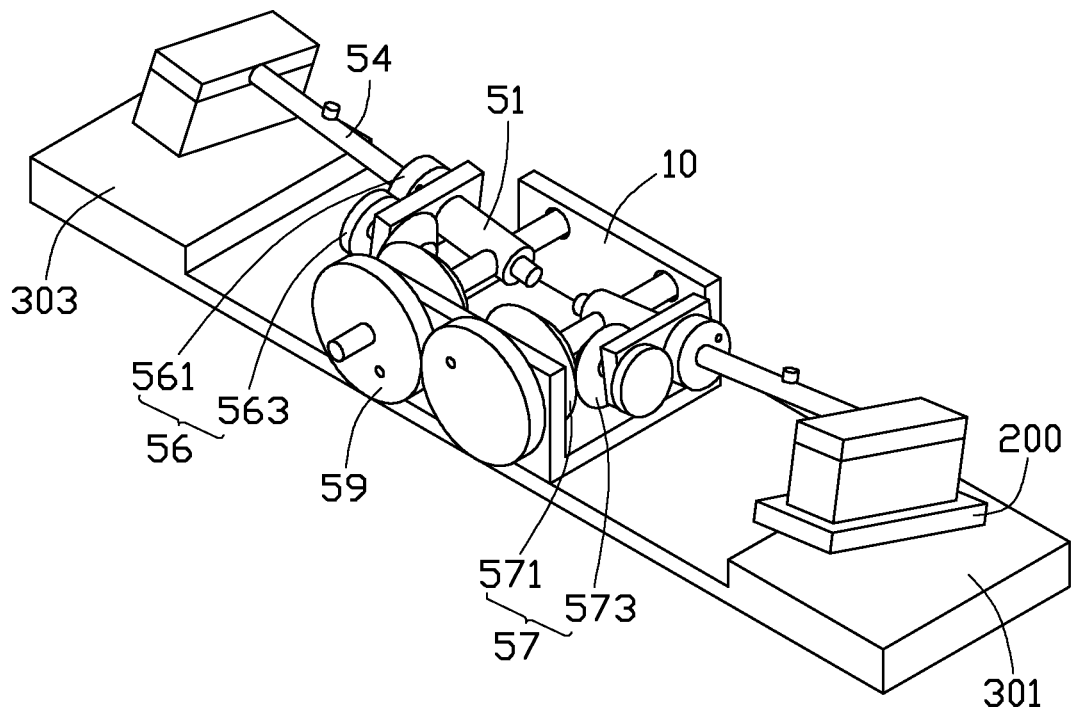
FIG. 2 is similar to FIG. 1, but viewed from another aspect
Figure 3:
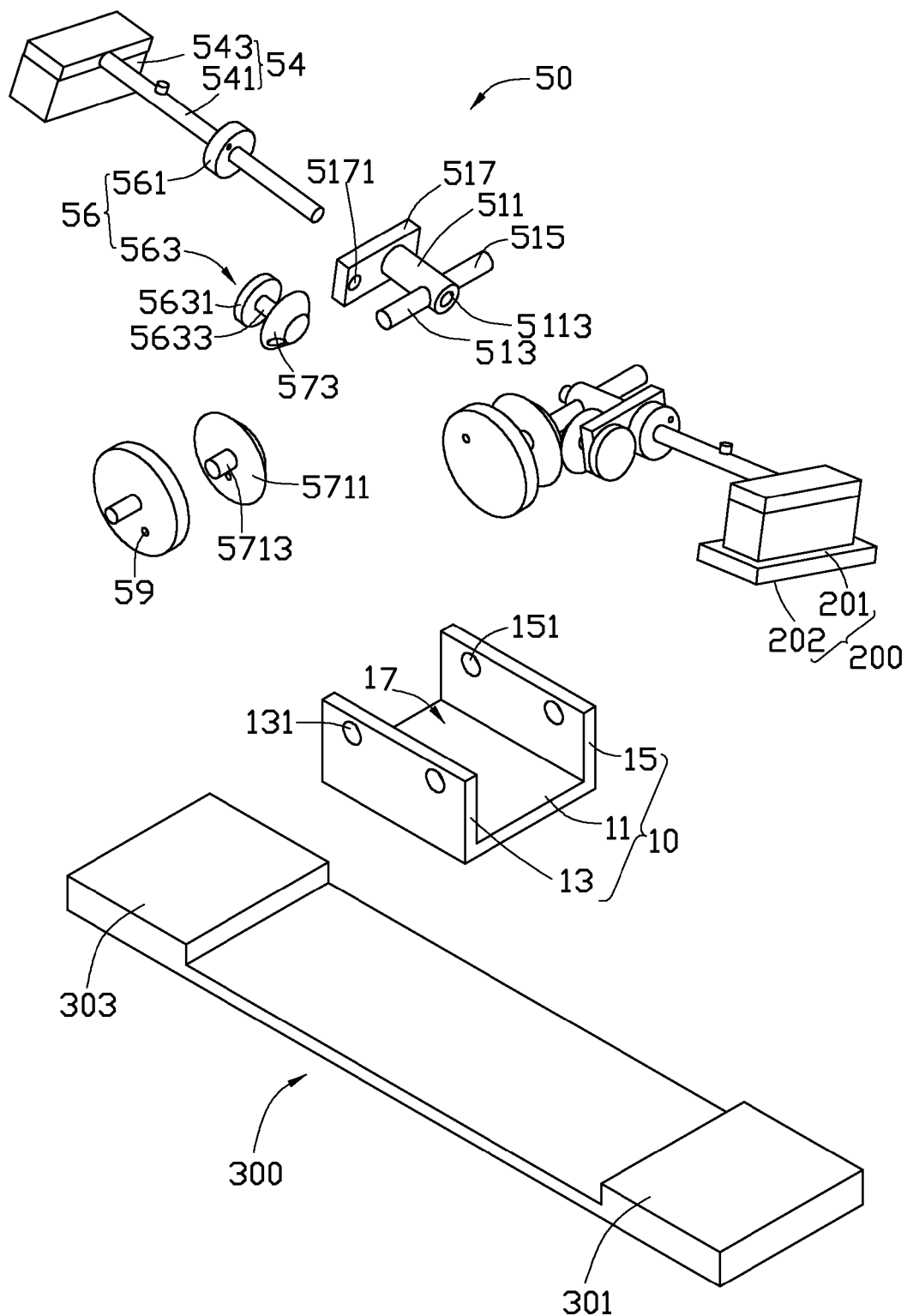
FIG. 3 is a partial, exploded view of the workpiece turning-over device of FIG. 1.

Referring to FIGS. 1 through 3, a workpiece turning-over device 100 applied for turning-over a workpiece 200 through 180 degrees and transporting the workpiece 200 from a first platform 301 of a worktable 300 to a second platform 303 of the worktable 300 is shown. In the illustrated embodiment, the workpiece 200 is a panel-shaped object. The workpiece 200 includes a front surface 201 and a rear surface 202 opposite to the front surface 201. The workpiece turning-over device 100 includes a support base 10, two moving arm assemblies 50, and a driver (not shown). The two moving arm assemblies 50 are oppositely positioned in the support base 10 and are meshed together. The driver is connected to one of the moving arm assemblies 50 to drive one of the moving arm assemblies 50 to rotate in one direction and thus causing the other moving arm assembly 50 to rotate in opposite direction, so as to turn-over or flip-over and transport the workpiece 200.

The support base 10 includes an installation wall 11, a first mounting wall 13, and a second mounting wall 15. The first, second mounting walls 13, 15 substantially perpendicularly extend up from opposite ends of the installation wall 11, such that the installation wall 11, the first mounting wall 13 and the second mounting wall 15 cooperative form a receiving space 17. Two first mounting holes 131 are separately defined in the first mounting wall 13. Two second mounting holes 151, aligned with the first mounting holes 131, are separately defined in the second mounting wall 15.

Each of the moving arm assemblies 50 includes a rotation member 51, a moving arm 54, a spur gear pair 56, a bevel pair 57, and a gear 59. Each of the rotation members 51 is rotatably-connected to and positioned between the first mounting wall 13 and the second mounting wall 15. The moving arm 54 is rotatably connected to the rotation member 51. The spur gear pair 56 is mounted on the rotation member 51 and the moving arm 54. The bevel gear pair 57 is positioned on the first mounting wall 13 and the rotation member 51.

Each rotation member 51 includes a connecting block 511, a first shaft 513, a second shaft 515, and a loading block 517. The first shaft 513 and the second shaft 515 substantially protrude from opposite sides of one end of the connecting block 511. A rotating hole 5113 is defined through the end surface of the connecting block 511 adjacent to the first shaft 513. One end of the first shaft 513 engages with, and can pivot in, one first mounting hole 131 away from the connecting block 511. One end of the second shaft 515 engages with, and can pivot in, one second mounting hole 151 away from the connecting block 511. The substantially-rectangular loading block 517 is fixedly connected to the connecting block 511 away from the first shaft 513. Two connecting holes 5171 are separately defined in the loading block 517. One connecting hole 5171 communicates with the rotating hole 5113 for rotation of the moving arm 54. The other connecting hole 5171 is located on an end of the loading block 517 away from the connecting block 511. In the illustrated embodiment, the rotation member 51 is integrally-formed for strength.

Each moving arm 54 includes an arm body 541 and a claw 543 positioned on one end of the arm body 541. The arm body 541 rotatably passes through the loading block 517 and the rotating hole 5113 away from the claw 543, and extends out from the receiving space 17 for supporting and holding the workpiece 200.

Each spur gear pair 56 includes a first spur gear 561 and a second spur gear 563 meshed with the first spur gear 561. The first spur gear 561 fixedly sleeves on the arm body 541. The second spur gear 563 includes a spur gear plate 5631 and a connecting shaft 5633 substantially protruding from the approximate center of the spur gear plate 5631. The spur gear plate 5631 is meshed with the first spur gear 561. The connecting shaft 5633 rotatably passes through one connecting hole 5171 to be fixed with the bevel gear pair 57.

Each bevel gear pair 57 includes a first bevel gear 571 and a second bevel gear 573. The first bevel gear 571 fixedly sleeves on the first shaft 513 adjacent to the first mounting wall 13 and is received in the receiving space 17. The first bevel gear 571 includes a bevel gear plate 5711 and a rotation shaft 5713 protruding from the bevel gear plate 5711. The bevel gear plate 5711 fixedly sleeves on the first shaft 513. The rotation shaft 5713 extends through the first mounting hole 131. The second bevel gear 573 is non-rotatably connected to an end of the connecting shaft 5633 away from the first spur gear 561. The loading block 517 is positioned between the second spur gear 563 and the second bevel gear 573. In the illustrated embodiment, a transmission ratio between the first bevel gear 571 and the second bevel gear 573 is ½, such that one revolution of each moving arm 54 is two revolutions of the rotation member 51 when the moving arm 54 is rotating together with the rotation member 51. The gear 59 fixedly sleeves on the end of the rotation shaft 5713 extending out of the support base 10. The two gears 59 of the two moving arm assemblies 50 are meshed with each other.

The driver is connected to one gear 59 of the two moving arm assemblies 50 and rotates the two rotation members 51.

In assembly, the first shaft 513 is connected to the first bevel gear 571, then the first bevel gear 571 is positioned in the receiving space 17, the rotation shaft 5713 is inserted into one first mounting hole 131, and the second shaft 515 is inserted into the second mounting hole 151. Next, the moving arm 54 is inserted into the loading block 517 and the connecting block 511 to connect with the rotation member 51. The connecting shaft 5633 passes through the connecting hole 5171 away from the moving arm 54, and the second spur gear 563 is meshed with the first spur gear 561. The second bevel gear 573 is non-rotatably connected to the connecting shaft 5633 and meshed with the first bevel gear 571. The gear 59 is connected to the rotation shaft 5713. Then, one moving arm assembly 50 is assembled to the support base 10. The other moving arm assembly 50 is then assembled similarly. Two gears 59 of the two moving arm assemblies 50 are meshed each other. The two moving arm assemblies 50 are oppositely and symmetrically positioned on the support base 10.

In use, the workpiece turning-over device 100 is positioned on the worktable 300 between the first platform 301 and the second platform 303. The installation wall 11 is positioned on the worktable 300. The workpiece 200 with a second surface 202 facing the worktable 300 is firstly positioned on the first platform 301. The two moving arms 54 are arranged in line and positioned above the first, second platforms 301, 303, respectively. The claw 543 of the moving arm assembly 50 above the first platform 301 grasps the workpiece 200 located underneath thereof. The first surface 201 of the workpiece 200 faces toward the claw 543. The driver rotates the gear 59. Then, the two moving arms 54 are driven to rotate to closing together away from the installation wall 11 (by sandwiching the workpiece 200 between the two claws 543 of the two moving arms 54). The two moving arms 54 are driven to revolve about their own axes by the bevel gear pairs 57 and the spur gear pair 56. The two claws 543 are driven to rotate through 180 degrees until reaching face to face next to each other, when the moving arms 54 are parallel to each other. Then, the workpiece 200 can be clamped between the two claws 543. During the closing process of the claws 543, an another workpiece 200 is loaded and positioned on the first platform 301, and is being processed.

Next, the firstly-attached claw 543 positioned adjacent to the first platform 301 releases the workpiece 200, while the other claw 543 positioned adjacent to the second platform 303 then grasps the workpiece 200. The driver then rotates the gear 59 in an opposite direction from the previous closing process of the two moving arms 54. The two moving arms 54 are driven towards the installation wall 11 and return to their original positions. Then, the workpiece 200 is turned-over through 180 degrees and is transported from the first platform 301 to the second platform 303 by means of the workpiece turning-over device 100. The moving arm 54, which is positioned adjacent to the first platform 301, clamps the workpiece 200 for processing and the workpiece turning-over device 100 enters a new working cycle.

The two moving arm assemblies 50 of the workpiece turning-over device 100 with simple structure are oppositely, symmetrically and rotatably positioned on the support base 10. One spur gear pair 56 and one bevel gear pair 57 are positioned in each moving arm assembly 50. Two moving arms 54 rotate in opposite directions when one rotation member 51 is driven to rotate, and revolve about their own axes. Then, the workpiece 200 is automatically turned-over to rotate 180 degrees and transported from the first platform 301 to the second platform 303 during the turning or flipping over process. Only one driver needs to be installed in the workpiece turning-over device 100, to save room within, and energy consumption thereof.

In other embodiments, the gear 59 of each moving arm assembly 50 can be omitted, thus one driver is positioned in each moving arm assembly 50 to non-rotatably connect with the first bevel gear 571 or with the rotation member 51.

In other embodiments, the first bevel gear 571 of each moving arm assembly 50 is not positioned in the support base 10.

In other embodiments, the transmission ratio of the first bevel gear 571 and the second bevel gear 573 is not limited to 1 to 2. The styles and relationship of the first bevel gear 571 and the second bevel gear 573 can be chosen according to practical need.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A workpiece turning-over device comprising:
a support base; and
two moving arm assemblies oppositely positioned in the support base, each moving arm assembly comprising:
a rotation member comprising a connecting block, a first shaft, a second shaft, and a loading block, the first shaft and the second shaft protruding from opposite sides of one end of the connecting block, the loading block connected to the other end of the connecting block, and the first shaft and the second shaft rotatably positioned in the support base;
a moving arm rotatably connected to the connecting block;
a spur gear pair comprising a first spur gear fixedly-sleeved on the moving arm, and a second spur gear rotatably connected with the loading block and meshed with the first spur gear;
a bevel gear pair comprising a first bevel gear non-rotatably connected with the first shaft, and a second bevel gear non-rotatably connected with the second spur gear and meshed with the first bevel gear; and
a gear non-rotatably connected with the first shaft and positioned out of the support base,
wherein the two gears of the two moving arm assemblies are meshed each other, one gear of the two moving arm assemblies is driven to rotate, and the two moving arms are driven to rotate in opposite directions to closing together and revolute about their own axes.

2. The workpiece turning-over device of claim 1, wherein the second spur gear comprises a spur gear plate and a connecting shaft substantially protruding from the spur gear plate, the connecting shaft passes through the loading block away from the connecting block, and the second bevel gear is non-rotatably connected to the connecting shaft away from the first spur gear, and the spur gear plate is meshed with the first spur gear.

3. The workpiece turning-over device of claim 1, wherein the support base comprises an installation wall, a first mounting wall, and a second mounting wall, the first mounting wall and the second mounting wall extend from opposite ends of the installation wall and bent towards a same direction, one end of the first shaft away from the connecting block is rotatably connected to the first mounting wall, and an end of the second shaft away from the connecting block is rotatably connected to the second mounting wall.

4. The workpiece turning-over device of claim 1, wherein the first bevel gear comprises a bevel gear plate and a rotation shaft protruding from the bevel gear plate, the bevel gear plate fixedly-sleeves on the first shaft, and the rotation shaft extends out of the support base, the gear is non-rotatably connected to the first shaft via connecting with the rotation shaft.

5. The workpiece turning-over device of claim 1, wherein each moving arm comprises an arm body and a claw positioned on one end of the arm body, and the arm body is rotatably connected with the rotation member away from the claw.

6. The workpiece turning-over device of claim 1, wherein a transmission ratio of the first bevel gear and the second bevel gear is ½.

7. A device used for turning-over and transporting a workpiece, comprising:
    a support base; and
    two moving arm assemblies oppositely positioned on the support base, each moving arm assembly comprising:
        a rotation member comprising a connecting block, a first shaft, a second shaft, and a loading block, the first shaft and the second shaft protruding from opposite sides of one end of the connecting block, the loading block connected to the other end of the connecting block, and the first shaft and the second shaft rotatably positioned in the support base;
        a moving arm rotatably connected to the connecting block;
        a spur gear pair comprising a first spur gear fixedly-sleeved on the moving arm away from the connecting block, and a second spur gear rotatably connected with the loading block and meshed with the first spur gear, the second spur gear comprising a spur gear plate and a connecting shaft substantially protruding from the spur gear plate, the connecting shaft passing through the loading block away from the connecting block, and the spur gear plate meshed with the first spur gear; and
        a bevel gear pair comprising a first bevel gear non-rotatably connected with the first shaft, and a second bevel gear non-rotatably connected with the second spur gear and meshed with the first bevel gear, the second bevel gear non-rotatably connected to the connecting shaft away from the spur gear plate,
        wherein two rotation members of the two moving arm assemblies are driven to rotate in opposite directions, and the two moving arms are driven to rotate to closing together and revolute about their own axes.

8. The device of claim 7, wherein the support base comprises an installation wall, a first mounting wall, and a second mounting wall, the first mounting wall and the second mounting wall extend from opposite ends of the installation wall and bent towards a same direction, one end of the first shaft away from the connecting block is rotatably connected to the first mounting wall, and an end of the second shaft away from the connecting block is rotatably connected to the second mounting wall.

9. The device of claim 7, wherein the first bevel gear comprises a bevel gear plate and a rotation shaft protruding from the bevel gear plate, the bevel gear plate fixedly-sleeves on the first shaft, and the rotation shaft extends out of the support base.

10. The device of claim 7, wherein each moving arm comprises an arm body and a claw positioned on one end of the arm body, and the arm body is rotatably connected with the rotation member away from the claw.

11. The device of claim 7, wherein a transmission ratio of the first bevel gear and the second bevel gear is ½.

\* \* \* \* \*